United States Patent
Morishita et al.

(10) Patent No.: US 10,369,498 B2
(45) Date of Patent: Aug. 6, 2019

(54) OIL DETERIORATION SUPPRESSING APPARATUS

(71) Applicant: TOYOTA BOSHOKU KABUSHIKI KAISHA, Aichi-ken (JP)

(72) Inventors: Hideto Morishita, Gifu-ken (JP); Yasuhiro Saito, Aichi-ken (JP); Ippei Fukutomi, Tokyo (JP); Motoichi Murakami, Shizuoka-ken (JP); Katsuichi Miyasaka, Shizuoka-ken (JP); Yasuhiro Ohmiya, Aichi-ken (JP); Hiroshi Moritani, Aichi-ken (JP); Mamoru Tohyama, Aichi-ken (JP); Narihito Tatsuda, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 13/865,509

(22) Filed: Apr. 18, 2013

(65) Prior Publication Data

US 2013/0292318 A1    Nov. 7, 2013

(30) Foreign Application Priority Data

May 7, 2012 (JP) .................................. 2012-106262

(51) Int. Cl.
*B01D 24/02* (2006.01)
*B01D 29/54* (2006.01)
(Continued)

(52) U.S. Cl.
CPC ....... *B01D 24/02* (2013.01); *C10M 175/0058* (2013.01); *C10M 175/0091* (2013.01);
(Continued)

(58) Field of Classification Search
None
See application file for complete search history.

(56) References Cited

U.S. PATENT DOCUMENTS 1,084,030 A    1/1914   Ramsey
1,981,089 A   11/1934   Carpenter
(Continued)

FOREIGN PATENT DOCUMENTS

CN       103906900         7/2014
DE       697 29 363       10/2004
(Continued)

OTHER PUBLICATIONS

Zhao, Xiu S., Lu, G. Q., Millar, Graeme J. "Advances in Mesoporous Molecular Sieve MCM-41." Ind. Eng. Chem. Res. 1996, 35, 2075-2090.*

(Continued)

*Primary Examiner* — Jonathan M Peo
(74) *Attorney, Agent, or Firm* — Greenblum & Bernstein, P.L.C.

(57) ABSTRACT

An oil deterioration suppressing apparatus is provided. The apparatus may include a filtering portion including a filter element for filtering oil, and a deterioration suppressing portion including a powdery deterioration retarder which suppresses deterioration of oil. The deterioration suppressing portion may include a flow passage wall which holds the powdery deterioration retarder and defines an oil flow passage, and the powdery deterioration retarder includes mesoporous inorganic material.

25 Claims, 11 Drawing Sheets

(51) Int. Cl.
*C10M 175/00* (2006.01)
*B01D 37/02* (2006.01)
*B01D 29/21* (2006.01)

(52) U.S. Cl.
CPC ............ *B01D 29/216* (2013.01); *B01D 29/54* (2013.01); *B01D 37/025* (2013.01); *C10M 2201/062* (2013.01); *C10M 2201/103* (2013.01); *C10M 2201/105* (2013.01); *C10N 2210/02* (2013.01); *C10N 2210/03* (2013.01)

(56) References Cited

U.S. PATENT DOCUMENTS

| | | | |
|---|---|---|---|
| 2,073,442 A | 3/1937 | Briggs | |
| 2,083,546 A | 6/1937 | Aldham | |
| 2,098,725 A | 11/1937 | Hurn | |
| 2,103,434 A | 12/1937 | Pennebaker | |
| 2,110,009 A | 3/1938 | Weidenbacker | |
| 2,148,708 A | 2/1939 | Orr | |
| 2,154,565 A | 4/1939 | Elmer | |
| 2,181,608 A | 11/1939 | Russell | |
| 2,207,399 A | 7/1940 | Moritz | |
| 2,209,180 A | 7/1940 | Von Pentz | |
| 2,233,093 A | 2/1941 | Wilton | |
| 2,300,014 A | 10/1942 | Saussure | |
| 2,328,131 A | 8/1943 | Eisler | |
| 2,680,520 A | 6/1954 | Beardsley | |
| 2,785,805 A | 3/1957 | Hough | |
| 2,995,253 A | 8/1961 | Belgarde et al. | |
| 3,054,507 A | 9/1962 | Humbert, Jr. et al. | |
| 3,095,370 A | 6/1963 | Krogman | |
| 3,144,407 A | 8/1964 | Olmos | |
| 3,158,571 A | 11/1964 | Supinger | |
| 3,210,229 A | 10/1965 | Feine | |
| 3,224,592 A | 12/1965 | Burns et al. | |
| 3,312,350 A | 4/1967 | Kasten | |
| 3,390,778 A * | 7/1968 | Uhen | B01D 27/06 210/314 |
| 3,465,883 A | 9/1969 | Jumper | |
| 3,467,256 A | 9/1969 | Humbert et al. | |
| 3,529,719 A | 9/1970 | Gravbill | |
| 3,591,010 A * | 7/1971 | Pall et al. | 210/493.1 |
| 3,837,495 A | 9/1974 | Baldwin | |
| 3,975,273 A | 8/1976 | Shaltz et al. | |
| 4,036,755 A | 7/1977 | Dahm et al. | |
| 4,048,071 A | 9/1977 | Yamada et al. | |
| 4,094,791 A | 6/1978 | Conrad et al. | |
| 4,144,166 A | 3/1979 | Dejovine | |
| 4,265,748 A * | 5/1981 | Villani | B01D 27/08 210/132 |
| 4,384,962 A | 5/1983 | Harris | |
| 4,557,829 A | 12/1985 | Fields | |
| 4,695,377 A | 9/1987 | Medley, III | |
| 4,802,979 A | 2/1989 | Medley, III | |
| 4,828,698 A | 5/1989 | Jewell et al. | |
| 4,886,599 A * | 12/1989 | Bachmann | B01D 27/02 210/287 |
| 4,950,400 A | 8/1990 | Girondi | |
| 5,017,285 A * | 5/1991 | Janik | B01D 17/00 210/232 |
| 5,035,797 A | 7/1991 | Janik | |
| 5,069,799 A * | 12/1991 | Brownawell | B01D 37/025 208/182 |
| 5,078,877 A | 1/1992 | Cudaback et al. | |
| 5,084,170 A | 1/1992 | Janik et al. | |
| 5,591,330 A | 1/1997 | Lefebvre | |
| 5,718,258 A | 2/1998 | Lefebvre | |
| 5,725,031 A | 3/1998 | Bilski et al. | |
| 6,045,692 A | 4/2000 | Bilski et al. | |
| 6,379,564 B1 * | 4/2002 | Rohrbach et al. | 210/765 |
| 6,391,193 B1 | 5/2002 | Luka | |
| 6,919,023 B2 | 6/2005 | Merritt et al. | |
| 6,969,461 B2 | 11/2005 | Beard et al. | |
| 6,984,319 B2 | 1/2006 | Merritt et al. | |
| 7,018,531 B2 | 3/2006 | Eilers et al. | |
| 7,132,047 B2 | 11/2006 | Beard et al. | |
| 7,182,863 B2 | 2/2007 | Eilers et al. | |
| 7,232,521 B2 | 6/2007 | Merritt et al. | |
| 7,238,285 B2 | 7/2007 | Hacker et al. | |
| 7,250,126 B2 | 7/2007 | Haberkamp et al. | |
| 7,267,769 B2 | 9/2007 | Baird et al. | |
| 7,297,256 B2 * | 11/2007 | Loftis | B01D 27/00 137/268 |
| 7,323,102 B2 | 1/2008 | Klein et al. | |
| 7,410,572 B2 | 8/2008 | Beard et al. | |
| 7,811,462 B2 | 10/2010 | Eilers et al. | |
| 7,931,817 B2 | 4/2011 | Bilski | |
| 8,327,818 B2 | 12/2012 | Jefferies et al. | |
| 8,425,772 B2 | 4/2013 | Martin et al. | |
| 8,772,208 B2 | 7/2014 | Fukutomi et al. | |
| 9,844,743 B2 | 12/2017 | Saito et al. | |
| 2002/0043495 A1 | 4/2002 | Beard et al. | |
| 2002/0195384 A1 | 12/2002 | Rohrbach et al. | |
| 2003/0111398 A1 | 6/2003 | Eilers et al. | |
| 2003/0226793 A1 | 12/2003 | Merritt et al. | |
| 2004/0140254 A1 | 7/2004 | Merritt et al. | |
| 2004/0140255 A1 | 7/2004 | Merritt et al. | |
| 2004/0178142 A1 | 9/2004 | Koslow | |
| 2005/0040092 A1 | 2/2005 | Eilers et al. | |
| 2005/0173325 A1 * | 8/2005 | Klein | B01D 27/06 210/206 |
| 2005/0194301 A1 | 9/2005 | Hacker et al. | |
| 2006/0000760 A1 * | 1/2006 | Beard | B01D 27/005 210/203 |
| 2006/0032814 A1 | 2/2006 | Haberkamp et al. | |
| 2006/0065601 A1 | 3/2006 | Baird et al. | |
| 2006/0260874 A1 * | 11/2006 | Lockledge | F01M 9/02 184/6.21 |
| 2007/0034559 A1 | 2/2007 | Beard et al. | |
| 2008/0135467 A1 * | 6/2008 | Martin | B01D 37/025 210/209 |
| 2010/0108018 A1 | 5/2010 | Jefferies et al. | |
| 2010/0163496 A1 | 7/2010 | Bilski | |
| 2011/0084010 A1 | 4/2011 | Mordukhovich et al. | |
| 2011/0278215 A1 | 11/2011 | Martin et al. | |
| 2012/0238480 A1 | 9/2012 | Fukutomi et al. | |
| 2012/0312731 A1 | 12/2012 | Ohmiya et al. | |
| 2014/0263022 A1 | 9/2014 | Saito et al. | |

FOREIGN PATENT DOCUMENTS

| | | |
|---|---|---|
| DE | 603 06 401 | 6/2007 |
| EP | 0842689 | 5/1998 |
| JP | 61-29764 | 7/1986 |
| JP | 62-21289 | 5/1987 |
| JP | 63-5762 | 2/1988 |
| JP | 63-46088 | 12/1988 |
| JP | 3-174207 | 7/1991 |
| JP | 03-296408 | 12/1991 |
| JP | 10-71306 | 3/1998 |
| JP | 11-22442 | 1/1999 |
| JP | 2001-038119 | 2/2001 |
| JP | 2003-532536 | 11/2003 |
| JP | 2005-502803 | 1/2005 |
| JP | 2008-126088 | 6/2008 |
| JP | 2008-540123 | 11/2008 |
| JP | 2011-256826 | 12/2011 |
| WO | 01/085882 | 11/2001 |
| WO | 02/096534 | 12/2002 |
| WO | 03/010421 | 2/2003 |
| WO | 2006/127652 | 11/2006 |
| WO | 2008/112997 | 9/2008 |
| WO | 2011093519 | 8/2011 |

OTHER PUBLICATIONS

Balci, S. "Effect of heating and acid pre-treatment on pore size distribution of sepiolite." Clay Minerals (1999) 34, 647-655.*

Y.C. Ke and P. Stroeve, "Polymer-Layered Silicate and Silica Nanocomposites", Elsevier, Amsterdam, 2005, 3 total pages.*

(56) References Cited

OTHER PUBLICATIONS

Ohmiya et al., Machine Translation of WO 2011/093519 A1, published Aug. 4, 2011, 80 total pages.*
Chinese Office Action for CN 201310156632.2 dated Jan. 21, 2015, along with an English-language translation thereof.
Japanese Office Action for JP App. No. 2012-106262 dated Dec. 28, 2015, along with an English-language translation thereof.
Japanese Office Action for JP App. No. 2012-106262 dated Jun. 7, 2016, along with English-language translation thereof.
U.S. Appl. No. 14/350,409 to Saito et al., filed Apr. 8, 2014.
U.S. Appl. No. 14/350,413 to Saito et al., filed Apr. 8, 2014.
German Office Action for DE 10 2013 207 818.8, dated Mar. 7, 2016, along with English-language translation thereof.
Final Official Action for the U.S. Appl. No. 14/350,413 dated Nov. 23, 2016.
Notice of Allowance from U.S. Patent and Trademark Office (USPTO) in U.S. Appl. No. 14/350,413, dated Aug. 14, 2017.
Official Action for the U.S. Appl. No. 14/350,413 dated Apr. 27, 2017.
Non-Final Official Action for the U.S. Appl. No. 14/350,409 dated Feb. 27, 2017.
Advisory Action for the U.S. Appl. No. 14/350,413 dated Mar. 14, 2017.
Final Official Action for the U.S. Appl. No. 14/350,409 dated Sep. 5, 2017.
European Office Action issued in Patent Application No. 12846907.9, dated Sep. 5, 2017.
Non-final Official Action for U.S. Appl. No. 14/350,409, dated Jan. 12, 2018.

* cited by examiner

OIL DETERIORATION SUPPRESSING APPARATUS

CROSS-REFERENCE TO RELATED APPLICATIONS

The present application claims priority under 35 U.S.C. § 119 of Japanese Application No. 2012-106262 filed on May 7, 2012, the disclosure of which is expressly incorporated by reference herein in its entirety.

BACKGROUND OF THE INVENTION

1. Field of the Invention

The present invention relates to an oil deterioration suppressing apparatus, and more particularly to an oil deterioration suppressing apparatus capable of enhancing a trapping effect of an oil deteriorating component and capable of reducing oil-flow resistance and restraining a pressure loss from increasing.

2. Description of Related Art

As a conventional filter element, there are known a filter element made of particles (e.g., hydrotalcite and the like) and fiber for removing carbon, acid, deteriorated materials and the like generated in an internal combustion engine (for example, see Related Art 1). In an oil filter using this filter element, as shown in FIG. 15 for example, a housing 102 in which a filter element 110 is accommodated is provided with an oil inflow passage 107 through which oil sent from an oil pan flows into the housing 102, and an oil outflow passage 108 through which oil filtered by the filter element 110 flows out to portions of an engine to be lubricated (e.g., crankshaft, cylinder wall, valve gear, etc.). Oil which flows into the housing 102 from the oil inflow passage 107 is filtered by the filter element 110, carbon and the like are removed by particles 115, and the oil flows out from the oil outflow passage 108 into a lubricating portion of the engine.

There is known a filter using a filtering material obtained by heating and forming an adhesive fiber processing material and a material for a filtering material containing sepiolite (for example, see Related Art 2). This filter has an excellent trapping effect of oiliness impurity component by using together with sepiolite, and is suitable for lubricating automobile engine.

[Related Art 1] JP-A 03-296408
[Related Art 2] JP-A 2001-38119

According to the conventional oil filter described in the Related Art 1, however, since all of oil sent from the oil pan passes through the filter element (so-called, fullflow filtration), particles such as hydrotalcite configuring the filter element become resistance and there is a problem that a pressure loss increases. According to the filter described in the Related Art 2, the trapping effect is merely evaluated using test oil containing specific test dust including carbon black, ferric oxide, and the like. In this document, a trapping effect of other deterioration components is not verified. Further, the sepiolite has a problem that a trapping effect of nitric ester which is one kind of deteriorated material of engine oil is small.

SUMMARY OF THE INVENTION

The present invention has been accomplished in view of the above-described circumstances, and it is an object of the invention to provide an oil deterioration suppressing apparatus capable of enhancing a trapping effect of oil deteriorating components, reducing oil-flow resistance and restraining a pressure loss from increasing.

An initial deteriorated material of oil is polymerized and becomes sludge. Hence, the initial deteriorated material such as nitric ester is absorbed to a pore surface of mesoporous inorganic material held by a deterioration suppressing portion included in an oil filter before the initial deteriorated material becomes sludge. According to this, it is possible to restrain the initial deteriorated material from becoming sludge, and to suppress deterioration of oil. Further, in the oil filter, a position of the deterioration suppressing portion holding the mesoporous inorganic material which can become resistance against oil flow is optimized with respect to oil flow in the filter. According to this, a pressure loss is restrained from increasing.

The present invention has been accomplished based on such finding.

One aspect of the present embodiments provides an oil deterioration suppressing apparatus, comprising: a filtering portion including a filter element for filtering oil; and a deterioration suppressing portion including powdery deterioration retarder which suppresses deterioration of oil, wherein the deterioration suppressing portion includes a flow passage wall which holds the deterioration retarder and forms an oil flow passage, and the deterioration retarder includes mesoporous inorganic material.

In a further aspect, an average pore diameter of the mesoporous inorganic material is 1 to 30 nm.

In a further aspect, a pore capacity of the mesoporous inorganic material is 0.3 to 4.0 cm$^3$/g.

In a further aspect, a specific surface of the mesoporous inorganic material is 120 to 2000 m$^2$/g.

In a further aspect, the mesoporous inorganic material is oxide-based inorganic material including an element selected from a group consisting of Si, Al, Fe, Ca and Mg.

In a further aspect, the flow passage wall is spirally or concentrically provided.

In a further aspect, the flow passage wall includes a corrugated portion which is formed into a corrugated shape.

In a further aspect, the apparatus further comprising a housing in which the deterioration suppressing portion and the filtering portion which is formed into a cylindrical shape are accommodated along an axial direction, wherein a cross-sectional area of a space between an inner wall of the housing and an outer peripheral side of the deterioration suppressing portion is smaller than a cross-sectional area of a space between the inner wall of the housing and an outer peripheral side of the filtering portion, the housing is provided with an oil inflow opening which is formed so as to open near one axial end of the deterioration suppressing portion on a side separated from the filtering portion.

In a further aspect, the flow passage wall is disposed so as to cover an outer periphery of the filtering portion.

According to the oil deterioration suppressing apparatus of the invention, deterioration of oil is suppressed at a deterioration suppressing portion which holds deterioration retarder including mesoporous inorganic material, and oil is filtered by a filtering portion. In the deterioration suppressing portion, oil flows along a surface side of a flow passage wall which holds the deterioration retarder and hence deterioration of oil is suppressed. According to this, oil cross-flows in the deterioration suppressing portion, and it is possible to reduce the oil-flow resistance and to restrain a pressure loss from increasing.

When an average pore diameter of the mesoporous inorganic material is 1 to 30 nm, initial deteriorated material easily enters a pore of the mesoporous inorganic material, is sufficiently absorbed into the pore, is restrained from becoming sludge. Consequently, deterioration of oil is suppressed.

Further, when a pore capacity of the mesoporous inorganic material is 0.3 to 4.0 cm$^3$/g, since there is a sufficient pore space for absorbing initial deteriorated material, the initial deteriorated material is easily absorbed and restrained from becoming sludge, and deterioration of oil is suppressed.

When a specific surface of the mesoporous inorganic material is 120 to 2000 m$^2$/g, since the mesoporous inorganic material has a sufficient surface area for absorbing initial deteriorated material, the initial deteriorated material is easily absorbed and further restrained from becoming sludge, and deterioration of oil is suppressed.

Further, when the mesoporous inorganic material is oxide-based inorganic material including an element selected from a group consisting of Si, Al, Fe, Ca and Mg, the mesoporous inorganic material sufficiently functions as deterioration retarder, the initial deteriorated material is absorbed to a pore surface and is restrained from becoming sludge, and deterioration of oil is sufficiently suppressed.

When the flow passage wall is spirally or concentrically provided, the deterioration suppressing portion can be reduced in size, and more room can be secured for an oil flow passage. Therefore, the oil-flow resistance can further be reduced, and a deterioration suppressing effect of oil obtained by the deterioration suppressing portion can be enhanced further.

When the flow passage wall has a corrugated portion, a distance between adjacent spiral or concentric flow passage walls can be increased and a larger oil flow passage can be secured.

Further, the oil deterioration suppressing apparatus may include a housing in which the deterioration suppressing portion and the filtering portion which is formed into a cylindrical shape are accommodated along an axial direction of the housing, a cross-sectional area of a space between an inner wall of the housing and an outer peripheral side of the deterioration suppressing portion is smaller than a cross-sectional area of a space between the inner wall of the housing and an outer peripheral side of the filtering portion, the housing is formed with an oil inflow opening, and the oil inflow opening opens near one axial end of the deterioration suppressing portion on a side separated from the filtering portion. According to this, oil which flows from the oil inflow passage into the housing passes and flows through the deterioration suppressing portion and the filtering portion in this order, and in the deterioration suppressing portion, oil flows more smoothly and reliably through a gap between adjacent spiral or concentric flow passage walls.

Further, when the flow passage wall is disposed so as to cover an outer periphery of the filtering portion, the apparatus can be made small, and an oil flow passage can be formed between an inner peripheral side of the flow passage wall and an outer peripheral side of the filtering portion.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DESCRIPTION OF THE EMBODIMENTS

Figure 1:
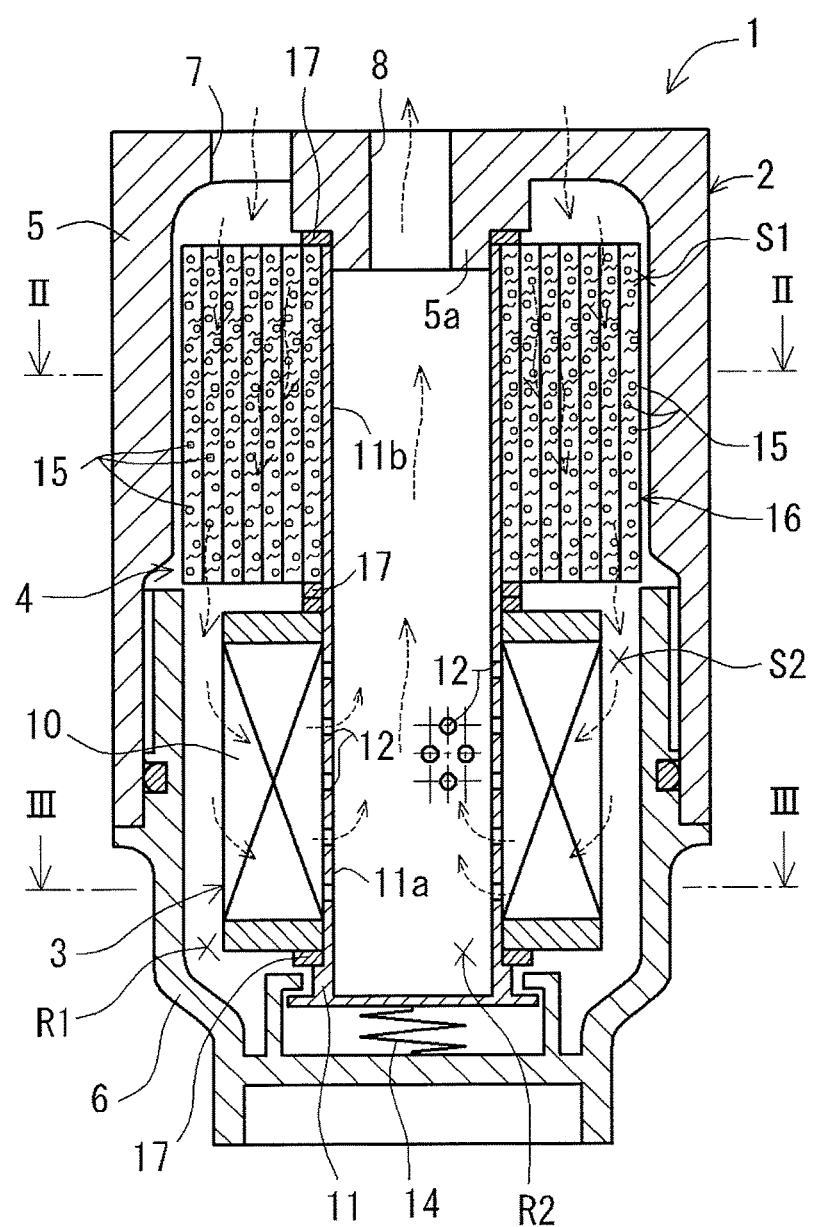
FIG. 1 is a vertical sectional view of an oil deterioration suppressing apparatus according to example 1.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

An oil deterioration suppressing apparatus (1, 21) according to a first embodiment includes a filtering portion (3, 23)

provided with a filter element (10) for filtering oil, and a deterioration suppressing portion (4, 24) provided with powdery deterioration retarder (15, 27) for suppressing deterioration of oil. The deterioration suppressing portion includes a flow passage wall (16, 28) which holds the deterioration retarder and forms an oil flow passage, and the deterioration retarder includes mesoporous inorganic material (see FIGS. 1, 6 and the like, for example).

A kind, deterioration suppressing configuration, and the like of the "powdery deterioration retarder" are not especially restricted only if the deterioration retarder includes mesoporous inorganic material and can suppress deterioration of oil. The mesoporous inorganic material is a porous inorganic material having mesopores, and an average pore diameter of the mesopores is normally 1 to 50 nm, preferably 1 to 30 nm and more preferably 2 to 25 nm. If the average pore diameter of mesopores is less than 1 nm, in many cases, diameters of the mesopores become less than a size of an object material to be trapped, and there is a tendency that the trapping performance is lowered. On the other hand, if the average pore diameter exceeds 30 nm, especially 50 nm, a specific surface becomes small, and there is a tendency that the trapping performance is lowered. Hence, it is preferable to select and use mesoporous inorganic material having an average pore diameter suitable for a size of an object material to be trapped.

A pore capacity of the mesoporous inorganic material is preferably 0.3 to 4.0 cm$^3$/g and more preferably 0.4 to 2.0 cm$^3$/g. If the pore capacity is less than 0.3 cm$^3$/g, initial deteriorated material is not sufficiently absorbed, and there is a tendency that generation of sludge cannot sufficiently be suppressed. On the other hand, it is physically difficult to form mesoporous inorganic material having a pore capacity exceeding 4.0 cm$^3$/g. Even if it is possible to form mesoporous inorganic material having a pore capacity exceeding 4.0 cm$^3$/g, strength and a shape as mesoporous structure cannot be maintained in some cases. If the pore capacity is 0.4 to 2.0 cm$^3$/g, initial deteriorated material is sufficiently absorbed. Further, it is easy to form mesoporous inorganic material, and the mesoporous inorganic material can have sufficient strength and a shape thereof can be maintained.

It is preferable that about 60% or more of an entire pore capacity is included in a range of about ±40% of an average pore diameter in a pore diameter distribution curve. Mesoporous inorganic material which satisfies this condition has high uniformity of diameters of pores. Here, "about 60% or more of an entire pore capacity is included in a range of about ±40% of an average pore diameter in a pore diameter distribution curve" means that when the average pore diameter is about 3 nm for example, about ±40% of the about 3 nm, i.e., a total of capacities of mesopores having an average pore diameter falling within a range of about 1.8 to 4.2 nm occupies about 60% or more of the entire pore capacities.

Further, a specific surface of the mesoporous inorganic material is preferably 120 to 2000 m$^2$/g, and more preferably, 400 to 1200 m$^2$/g. If the specific surface is less than 120 m$^2$/g, the initial deteriorated material is not sufficiently absorbed, and there is a tendency that generation of sludge cannot sufficiently be suppressed. It is physically difficult to form mesoporous inorganic material having a specific surface exceeding 2000 m$^2$/g. Even if it is possible, strength and a shape as mesoporous structure cannot be maintained in some cases. If the specific surface is 400 to 1200 m$^2$/g, initial deteriorated material is sufficiently absorbed, and the mesoporous inorganic material has sufficient strength and a shape thereof can be maintained.

The mesoporous inorganic material has mesopores and only need to suppress deterioration of oil. Although not especially limited, the mesoporous inorganic material preferably has the above-described average pore diameter, pore capacity and specific surface. More preferably mesoporous inorganic material has an average pore diameter of 1 to 30 nm, preferably 2 to 25 nm, and a pore capacity of 0.3 to 4.0 cm$^3$/g, preferably 0.4 to 2.0 cm$^2$. More preferably mesoporous inorganic material has an average pore diameter of 1 to 30 nm, preferably 2 to 25 nm, and a specific surface of 120 to 2000 m$^2$/g, preferably 400 to 1200 m$^2$/g. More preferably mesoporous inorganic material has a pore capacity of 0.3 to 4.0 cm$^3$/g, preferably 0.4 to 2.0 cm$^3$/g, and a specific surface of 120 to 2000 m$^2$/g, preferably 400 to 1200 m$^2$/g. More preferably mesoporous inorganic material has an average pore diameter of 1 to 30 nm, preferably 2 to 25 nm, a pore capacity of 0.3 to 4.0 cm$^3$/g, preferably 0.4 to 2.0 cm$^3$/g, and a specific surface of 120 to 2000 m$^2$/g, preferably 400 to 1200 m$^2$/g.

An average pore diameter, a pore capacity and a specific surface of mesoporous inorganic material can be measured in the following manner.

A nitrogen adsorption isotherm in 77K is measured by a constant-volume method using a fully automatic gas absorption measurement apparatus (produced by BELL JAPAN, INC., type of model "BELSORP-mini II"). To eliminate influence of adsorbed water, thermal processing was carried out at 150° C. for two hours under vacuum as preprocessing. A pore capacity (Vp) was obtained from an absorption amount under P/P0 (relative pressure)=0.95 from the adsorption isotherm obtained. A pore diameter distribution was obtained by a BJH method, and a peak value of the pore diameter distribution was determined as an average pore diameter. A specific surface was calculated by a BET plot from an adsorption amount under the P/P0 (relative pressure) of 0.05 to 0.20.

A specific example of mesoporous inorganic material is oxide-based inorganic material including various kinds of elements. For example, it is possible to use oxide-based inorganic material including elements selected from a group consisting of Si, Al, Fe, Ca and Mg. It is also possible to use oxide-based inorganic material including elements such as Nb, Ta, Zr, Ti and Zn. As the mesoporous inorganic material, oxide-based inorganic material including Si and/or Al is preferable. Examples of such oxide-based inorganic material are indefinite mesoporous silica-based inorganic material called FSM (Folded Sheet Mesoporous Material) having a honeycomb type structure, activated white clay having Si and Al, silica gel and activated alumina. In the case of sepiolite, even if it has mesopores, a pore capacity thereof is small, and adsorption ability of nitric ester which is initial deteriorated material of oil is low. Therefore, sepiolite is excluded from mesoporous inorganic material in this invention.

It is only necessary that mesoporous inorganic material is included in the deterioration retarder, but when an entire amount of deterioration retarder is set to 100% by mass, it is preferable that mesoporous inorganic material is 10% by mass or more. Further, it is preferable that mesoporous inorganic material is 20% by mass or more, and it is especially preferable that an entire amount of deterioration retarder is mesoporous inorganic material. When other deterioration retarder excluding mesoporous inorganic material is included, this other deterioration retarder is not especially limited, and examples of the deterioration retarder are acidic white clay, diatom earth, zeolite, non-porous silica, hydrotalcite and various ion-exchange resin powder.

Although an average particle size of mesoporous inorganic material is not especially limited, it is preferable that the average particle size is in a range of 0.1 to 200 μm, more preferably in a range of 2.5 to 150 μm, and more preferably in a range of 10 to 100 μm. This average particle size is a particle size (median diameter) when a cumulative sum of weight becomes 50% in granularity distribution measurement conducted by laser beam diffractometry.

Material, a shape and the like of the "flow passage wall" are not especially restricted only if deterioration retarder is maintained and an oil flow passage is formed. This flow passage wall is usually a porous layer. Examples of the flow passage wall are: fiber body such as nonwoven fabric, paper, fabric and knit fabric; resin open cell foamed body such as urethane; and resin porous film. A void ratio of the flow passage wall can be 0.5 to 0.99 (preferably 0.8 to 0.99), for example. According to this, deterioration retarder can be dispersed appropriately and maintained, and it is possible to form a flow passage wall into which oil can easily infiltrate and through which oil cannot easily pass in its thickness direction. The "void ratio" is usually calculated using an equation {1−[weight per unit area of flow passage wall/(thickness of flow passage wall×density of material configuring flow passage wall)]}.

Figure 2:
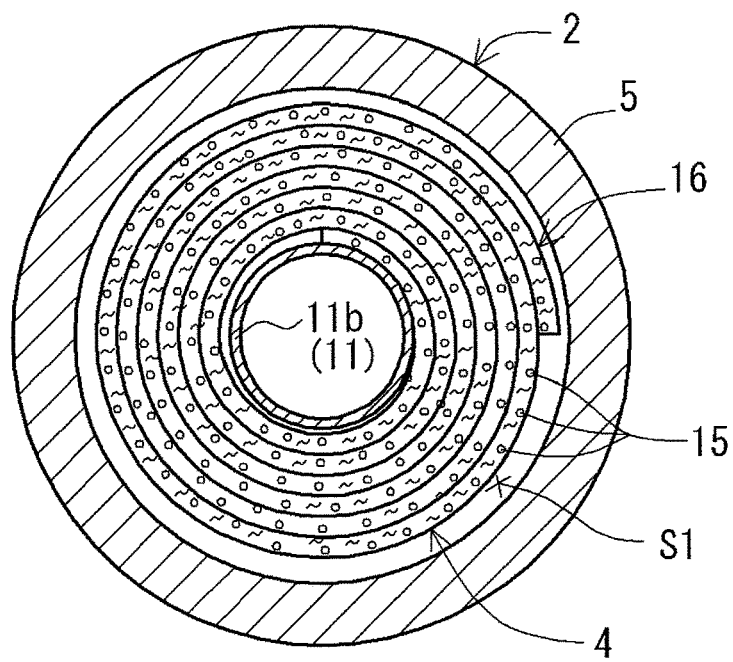
FIG. 2 is an enlarged sectional view taken along a line II-II in FIG. 1.
Figure 9A:
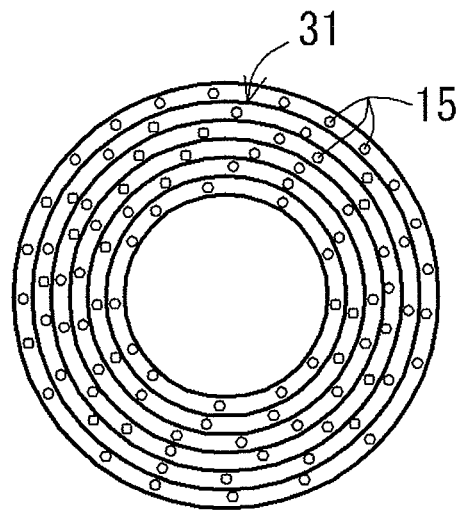
FIG. 9A is an explanatory diagram for explaining a deterioration suppressing portion according to other embodiment which shows an embodiment wherein flow passage walls are concentrically provided.
Figure 9B:
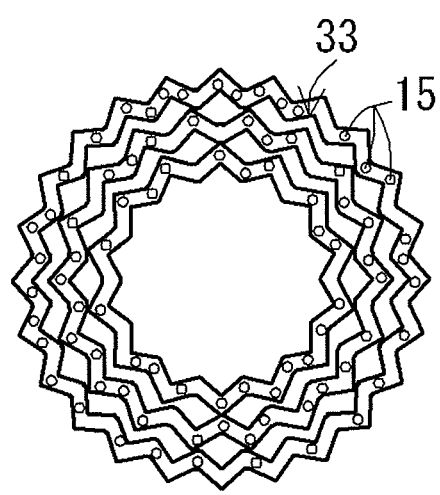
FIG. 9B is an explanatory diagram for explaining a deterioration suppressing portion according to other embodiment which shows an embodiment where flow passage walls have corrugated portions.
Figure 10:
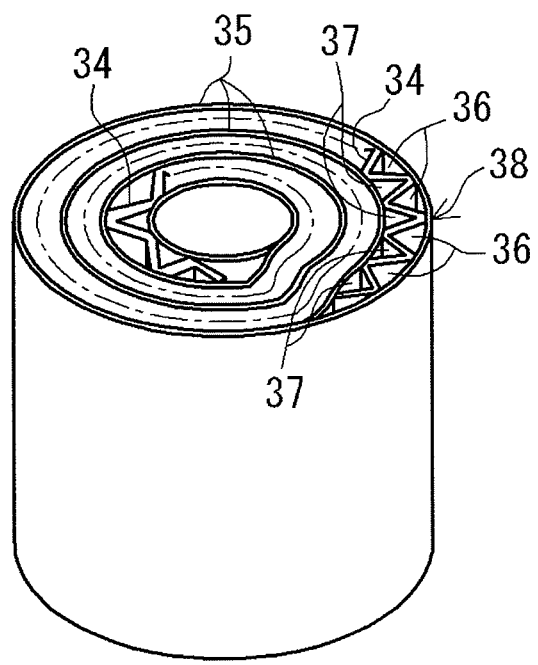
FIG. 10 is a perspective view of a deterioration suppressing portion according to another embodiment.

As the oil deterioration suppressing apparatus (1) of the first embodiment, it is possible to employ a configuration that the flow passage walls (16, 31, 33, 38) are spirally or concentrically provided (see FIGS. 2, 9, 10 and the like, for example). In this case, oil usually passes through a gap between adjacent flow passage walls and deterioration is suppressed. The number of windings and thickness of the flow passage walls can appropriately be selected in accordance with a flow rate of oil and the like.

In the case of the above-described configuration, the flow passage wall (33, 38) can have a corrugated portion (34) which is formed into a corrugated shape (see FIGS. 9B, 10 and the like, for example). In this case, the flow passage wall (33) can have plate-shaped portions (35) which are laminated on both surfaces of the corrugated portion (34) (see FIG. 10 and the like, for example). According to this, the oil flow passage can be formed as a strong honeycomb structure.

Figure 3:
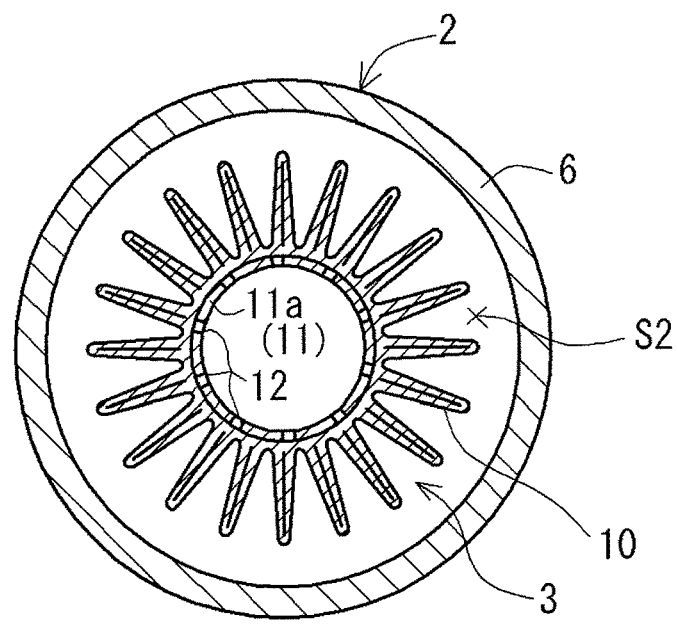
FIG. 3 is an enlarged sectional view taken along a line III-III in FIG. 1.

In the case of the above-described configuration, the oil deterioration suppressing apparatus further includes a housing (2) in which the deterioration suppressing portion (4) and the filtering portion (3) are accommodated along an axial direction, the filtering portion is formed into a cylindrical shape, a cross-sectional area (Si) of a space between an inner wall of the housing and an outer peripheral side of the deterioration suppressing portion is smaller than a cross-sectional area (S2) of a space between the inner wall of the housing and an outer peripheral side of the filtering portion, an oil inflow opening (7) is formed in the housing, and the oil inflow opening opens near one axial end of the deterioration suppressing portion on a side separated from the filtering portion (see FIGS. 1 to 3 and the like, for example). In this case, the oil inflow passage (7) can open so as to be opposed to an axial end surface of the deterioration suppressing portion (4) (see FIG. 1 and the like, for example). According to this, oil flows more smoothly and reliably between the adjacent spiral or concentric flow passage walls. A ratio (S1/S2) of the cross-sectional areas can be less than 0.1 to 1 (preferably 0.25 to 0.75), for example.

Figure 6:
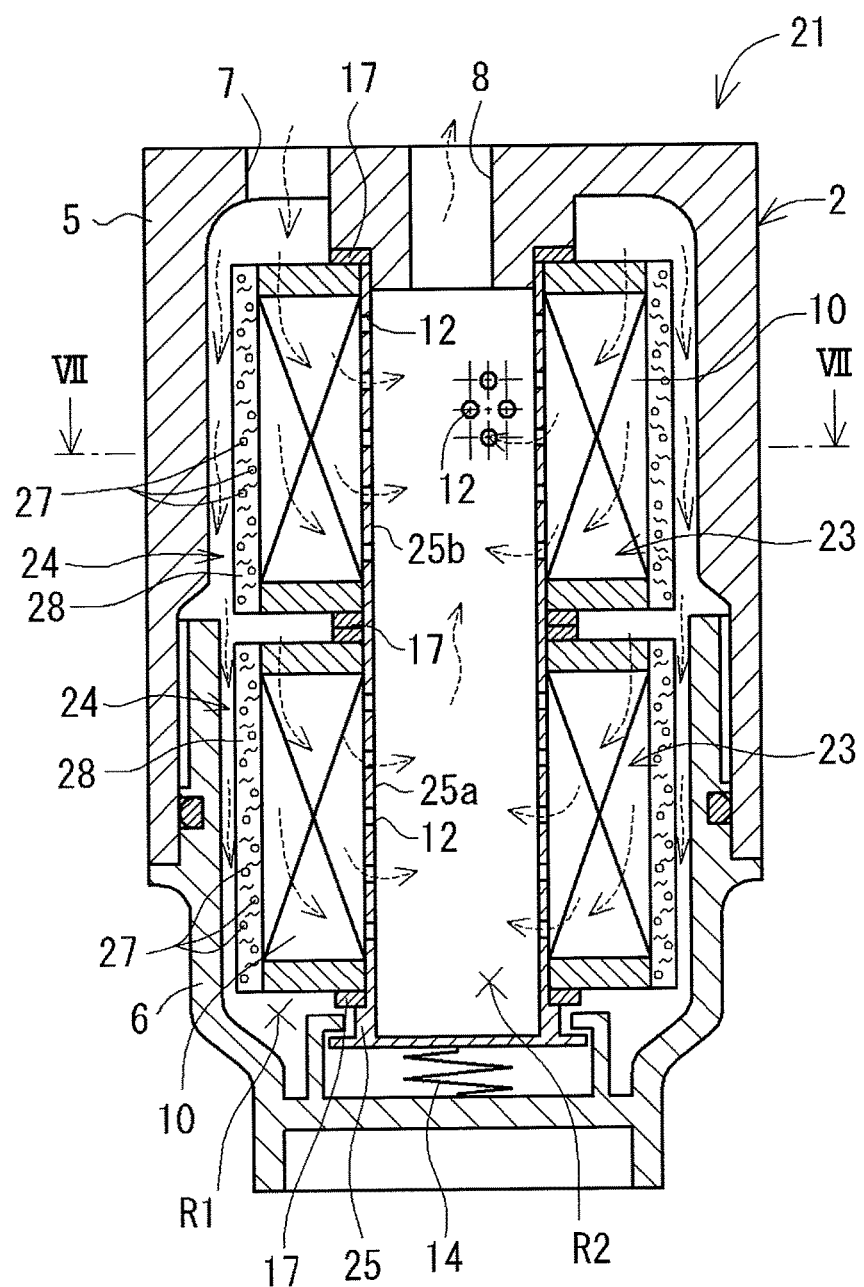
FIG. 6 is a vertical sectional view of an oil deterioration suppressing apparatus according to example 2.

As the oil deterioration suppressing apparatus (21) of the first embodiment, it is possible to employ a configuration that the flow passage wall (28) is disposed so as to cover an outer periphery of the filtering portion (23), for example (see FIG. 6 and the like, for example). In this case, the oil deterioration suppressing apparatus includes the cylindrical filtering portion (23) and a housing (2) in which the deterioration suppressing portion (24) is accommodated, and an oil inflow passage (7) which opens so as to be opposed to an axial end surface of at lease one of the filtering portion and the deterioration suppressing portion can be formed in the housing (see FIG. 6 and the like, for example). According to this, oil flows more smoothly and reliably through a gap between the flow passage wall and the filter element.

EXAMPLES

The present invention will be described below specifically based on examples using the drawings. In the examples, an oil deterioration suppressing apparatus which suppresses deterioration of engine oil (also called simply "oil" hereinafter) is exemplified. A test for evaluating a deterioration suppressing effect was carried out using various kinds of mesoporous inorganic materials and the like.

1. Deterioration Suppressing Apparatus

Example 1

(1) Configuration of Oil Deterioration Suppressing Apparatus

As shown in FIG. 1, an oil deterioration suppressing apparatus 1 of the example includes a filtering portion 3 and a deterioration suppressing portion 4 which are arranged side by side in an axial direction and accommodated in the housing 2. The housing 2 includes a first case 5 and a second case 6. The cases 5 and 6 in the axial direction are opened, and they have bottomed cylindrical shapes. The cases 5 and 6 are detachably fixed through screws formed on the side of the open ends.

Figure 5:
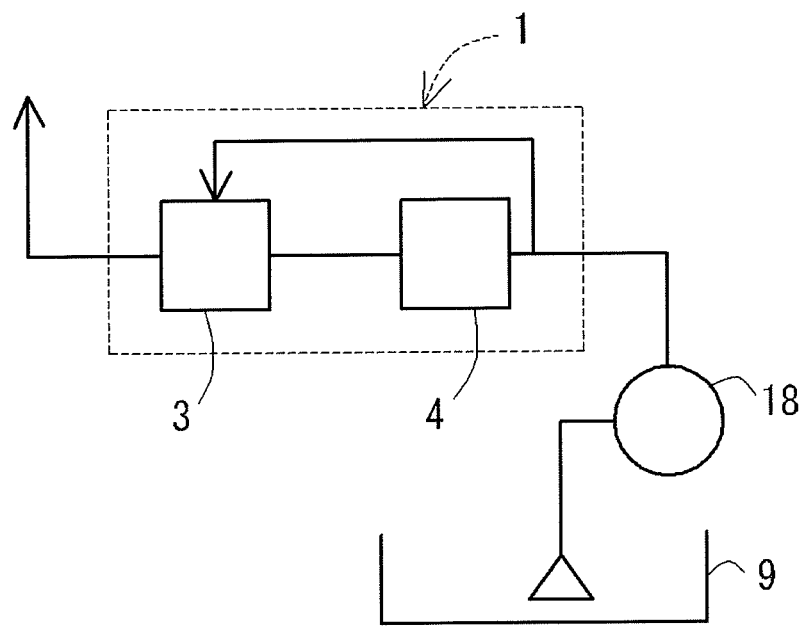
FIG. 5 is an explanatory diagram for explaining the action of the oil deterioration suppressing apparatus.

An oil inflow passage 7 through which oil flows into the housing 2 and an oil outflow passage 8 through which oil flows out from the housing 2 are formed in a bottom of the first case 5. The oil inflow passage 7 opens so as to be opposed to an axial end surface of the deterioration suppressing portion 4. The oil inflow passage 7 is connected to an oil pan 9 in which oil is stored (see FIG. 5) through a pipe and the like. The oil outflow passage 8 is connected to portions of an engine to be lubricated (e.g., crankshaft, cylinder wall, valve gear, etc.) through a passage and the like formed in the engine.

As shown in FIGS. 1 and 3, the filtering portion 3 includes a filter element 10 for filtering oil and a cylindrical protector 11 which supports the filter element 10. The filter element 10 is formed into a cylindrical shape (also called "chrysanthemum shape") by folding a nonwoven fabric sheet material into a corrugated shape. The protector 11 includes a first support portion 11a which supports the filter element 10, and a second support portion 11b which is continuous with one end of the first support portion 11a and which supports the deterioration suppressing portion 4. A large number of through holes 12 are formed in the first support portion 11a. The protector 11 is biased toward the first case 5 by a spring 14 provided between one axial end of the protector 11 and a bottom of the second case 6. The other axial end of the protector 11 is fitted into a convex portion 5a formed on a bottom of the first case 5.

An interior space of the housing 2 is partitioned by the filter element 10 and the protector 11 into an upstream space R1 which is connected to the oil inflow passage 7 and which is located before filtering (i.e., space where oil before being filtered exists) and a downstream space R2 which is connected to the oil outflow passage 8 and which is located after filtering (i.e., space where filtered oil exists).

As shown in FIGS. 1 and 2, the deterioration suppressing portion 4 includes a powdery deterioration retarder 15 including mesoporous inorganic material which suppresses deterioration of oil, and a flow passage wall 16 which holds the deterioration retarder 15 and forms an oil flow passage. The flow passage wall 16 is wound around an outer periphery of the second support portion 11b of the protector 11, and disposed spirally around a shaft of the housing 2. The flow passage wall 16 is formed from nonwoven fabric porous layer, and a void ratio thereof is about 0.90. Hence, the flow passage wall 16 appropriately disperses and holds the deterioration retarder 15, and oil easily infiltrates into the flow passage wall 16 and does not easily pass through the flow passage wall 16 in its thickness direction. In this example, powdery deterioration retarder 15 is dispersed and mixed during the forming process of the flow passage wall 16. Axial end edges of the deterioration suppressing portion 4 and the filtering portion 3 are sealed by a rubber seal material 17.

Here, a cross-sectional area S1 (see FIG. 2) of a space between an inner peripheral wall of the first case 5 and an outer peripheral side of the deterioration suppressing portion 4 is about 240 mm$^2$, and a cross-sectional area S2 (see FIG. 3) of a space between an inner peripheral wall of the second case 6 and an outer peripheral side of the filtering portion 3 is about 460 mm$^2$. By setting the area S1 smaller than the area S2 in this manner, oil smoothly and reliably flows through a gap between adjacent spiral flow passage walls 16.

(2) Operation of Oil Deterioration Suppressing Apparatus

Figure 4:
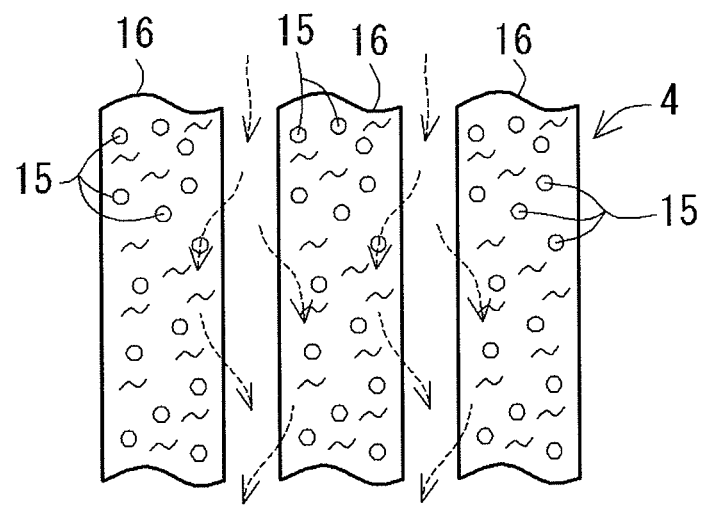
FIG. 4 is an explanatory diagram for explaining action of the oil deterioration suppressing apparatus.

Next, operation of the oil deterioration suppressing apparatus 1 having the above-described configuration will be described. By operation of a pump 18 (see FIG. 5), oil stored in the oil pan 9 is sent to the oil deterioration suppressing apparatus 1. As shown in FIG. 1, oil sent to the oil inflow passage 7 flows into the upstream space R1 in the housing 2, then flows along an axial direction of the housing 2, and sequentially passes through the deterioration suppressing portion 4 and the filtering portion 3. In the deterioration suppressing portion 4, oil passes through a gap between adjacent spiral flow passage walls 16, and a space between an inner wall of the housing 2 and the outermost peripheral flow passage wall 16. At this time, oil flowing on the surface side of the flow passage wall 16 infiltrates into the flow passage wall 16, comes into contact with the deterioration retarder 17 to suppress deterioration, and returns to the surface side of the flow passage wall 16 (see FIG. 4). Oil which has passed through the deterioration suppressing portion 4 reaches the filtering portion 3, foreign matters (e.g., dust, metal worn piece and sludge) in the oil are trapped by the filter element 10, and then the oil is sent to portions of the engine to be lubricated through the downstream space R2 and the oil outflow passage 8 via the through holes 12 of the protector 11.

(3) Effect of Example

As described above, according to this example, deterioration of oil is suppressed by the deterioration suppressing portion 4, and oil is filtered by the filtering portion 3. In the deterioration suppressing portion 4, oil flows along the surface side of the flow passage wall 16 which holds the deterioration retarder 15, thereby suppressing deterioration of oil. According to this, oil cross-flows in the deterioration suppressing portion 4, oil-flow resistance of oil can be reduced, and it is possible to restrain a pressure loss from increasing.

In the example, since the flow passage wall 16 is provided spirally, the deterioration suppressing portion 4 can be reduced in size and more room can be secured for the oil flow passage. Hence, the oil-flow resistance of oil can be reduced further, and the deterioration suppressing effect of oil achieved by the deterioration suppressing portion 4 can be enhanced further.

Further, in this example, the housing 2 in which the deterioration suppressing portion 4 and the cylindrical filtering portion 3 are accommodated along the axial direction is provided, the cross-sectional area S1 of the space between the inner wall of the housing 2 and the outer peripheral side of the deterioration suppressing portion 4 is set smaller than the cross-sectional area S2 of the space between the inner wall of the housing 2 and the outer peripheral side of the filtering portion 3, and the oil inflow passage 7 which opens near the one axial end of the deterioration suppressing portion 4 on the side separated from the filtering portion 3 is formed in the housing 2. Therefore, oil which flows from the oil inflow passage 7 into the housing 2 passes through the deterioration suppressing portion 4 and the filtering portion 3 in this order, and the oil flows more smoothly and reliably through the gap between the adjacent spiral flow passage walls 16 in the deterioration suppressing portion 4. Especially, in this example, since the oil inflow passage 7 is opposed to the axial end surface of the deterioration suppressing portion 4, oil flows more smoothly and reliably between the adjacent spiral flow passage walls 16.

Example 2

Next, an oil deterioration suppressing apparatus according to this example 2 will be described. In the oil deterioration suppressing apparatus of the example 2, the same reference numerals are allocated to constituent parts which are substantially the same as those of the oil deterioration suppressing apparatus of the example 1, and detailed description thereof will be omitted.

(1) Configuration of Oil Deterioration Suppressing Apparatus

Figure 7:
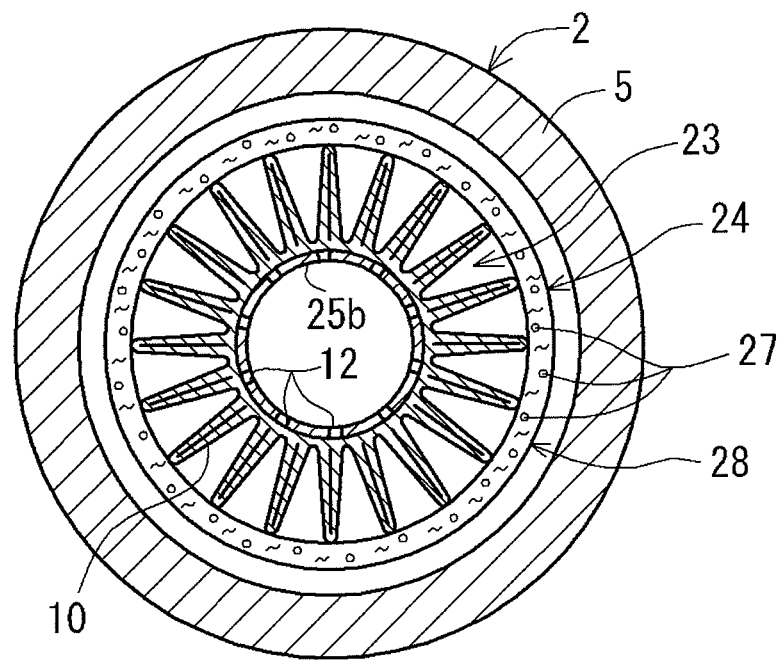
FIG. 7 is an enlarged sectional view taken along a line VII-VII in FIG. 6.

As shown in FIGS. 6 and 7, an oil deterioration suppressing apparatus 21 of this embodiment includes a plurality of sets of (two sets in the drawings) filtering portions 23 and deterioration suppressing portions 24 which are accommodated in a housing 2. The housing 2 includes a first case 5 and a second case 6. An oil inflow passage 7 formed in a bottom of the first case 5 opens so as to be opposed to axial end surfaces of one set of the filtering portion 23 and the deterioration suppressing portion 24.

Each of the filtering portions 23 includes a filter element 10 which filters oil, and a cylindrical protector 25 which supports the filter element 10. The protector 25 includes a first support portion 25a which supports the filter element 10 of one of the sets, and a second support portion 25b which is connected to one axial end of the first support portion 25a and which supports the filter element 10 of the other set. A large number of through holes 12 are formed in the support portions 25a and 25b.

Here, an interior space of the housing 2 is partitioned by the filter element 10 and the protector 25 into an upstream space R1 which is connected to the oil inflow passage 7 and located before filtering (i.e., space where oil before being filtered exists) and a downstream space R2 which is connected to the oil outflow passage 8 and located after filtering (i.e., space where filtered oil exists).

The deterioration suppressing portion 24 includes powdery deterioration retarder 27 including mesoporous inorganic material which suppresses deterioration of oil, and a cylindrical flow passage wall 28 which holds the deterioration retarder 27 and forms an oil flow passage. The flow passage wall 28 is disposed so as to cover an outer periphery of the filtering portion 23. More specifically, the flow passage wall 28 is fixed to an outer peripheral side of the filter element 10 through adhesive or the like. The flow passage wall 28 is formed from nonwoven fabric porous layer, and a void ratio thereof is about 0.98. Hence, the flow passage wall 28 appropriately disperses and holds the deterioration retarder 27, and oil easily infiltrates into the flow passage wall 28 and does not easily pass through the flow passage wall 28 in its thickness direction. In this example, powdery deterioration retarder 27 is dispersed and mixed during the process of forming the flow passage wall 28.

(2) Operation of Oil Deterioration Suppressing Apparatus

Figure 8:
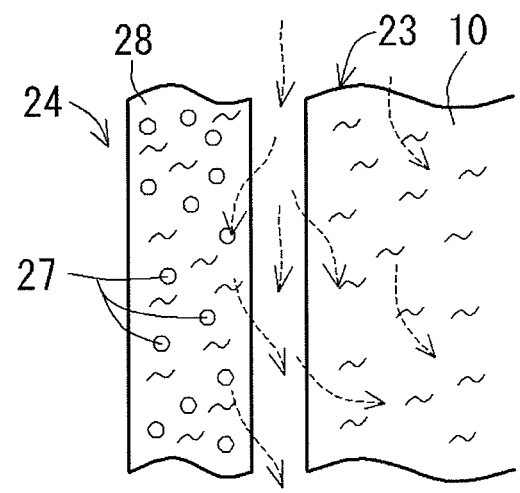
FIG. 8 is an explanatory diagram for explaining action of the oil deterioration suppressing apparatus.

Next, operation of the oil deterioration suppressing apparatus 21 having the above-described configuration will be described. As shown in FIG. 6, oil which is sent to the oil inflow passage 7 flows into the upstream space R1 in the housing 2, flows along the axial direction of the housing 2, and sequentially passes through the plurality of sets of the deterioration suppressing portions 24 and the filtering portions 23. In each set of the deterioration suppressing portion 24 and the filtering portion 23, oil passes between an inner peripheral side of the flow passage wall 28 and an outer peripheral side of the filter element 10, and between an inner wall of the housing 2 and an outer peripheral side of the flow passage wall 28. At this time, oil which flows on the surface side of the flow passage wall 28 infiltrates into the flow passage wall 28, comes into contact with the deterioration retarder 27 to suppress deterioration, and then returns to the surface side of the flow passage wall 28 (see FIG. 8). Oil whose deterioration is suppressed reaches the filtering portion 23, foreign matters (e.g., dust, metal worn piece and sludge) in the oil are trapped by the filter element 10, and the oil is sent to portions of the engine to be lubricated through the downstream space R2 and the oil outflow passage 8 via the through holes 12 of the protector 25.

(3) Effect of Example

As described above, according to the oil deterioration suppressing apparatus 21 of this example, substantially the same working effect as that of the oil deterioration suppressing apparatus 1 of the example 1 can be exerted. In addition, since the flow passage wall 28 is disposed so as to cover the outer periphery of the filtering portion 23, the apparatus 21 can be reduced in size, and the oil flow passage can be formed between the inner peripheral side of the flow passage wall 28 and the outer peripheral side of the filtering portion 23.

Further, in the example 2, the housing 2 in which the deterioration suppressing portion 24 and the cylindrical filtering portion 23 are accommodated is provided, and the oil inflow passage 7 which opens so as to be opposed to the axial end surfaces of the filtering portion 23 and the deterioration suppressing portion 24 is formed. Therefore, oil flows more smoothly and reliably through the gap between the flow passage wall 28 and the filter element 10.

The invention is not limited to the examples 1 and 2, and it is possible to variously change the examples within a scope of the invention in accordance with an object and intended usage. That is, although the flow passage wall 16 is disposed spirally in the example 1, the invention is not limited thereto, and flow passage walls 31 may be disposed concentrically as shown in FIG. 9A.

Although the flow passage walls 16 and 28 are formed only from the plate-shaped portions in the examples 1 and 2, the invention is not limited thereto, and it is possible to employ flow passage walls 33 formed from corrugated portions as shown in FIG. 9B. According to this, a distance between the adjacent flow passage walls 33 is increased and a larger oil flow passage can be secured. As shown in FIG. 10, for example, it is possible to employ a flow passage wall 38 including corrugated portions 34 and plate-shaped portions 35 laminated on both surfaces of each of the corrugated portions 34, a first flow passage 36 is formed between one of the plate-shaped portions 35 and the corrugated portion 34, and a second flow passage 37 is formed between the other plate-shaped portion 35 and the corrugated portion 34. According to this, the oil flow passage can be formed as a strong honeycomb structure.

Figure 11:
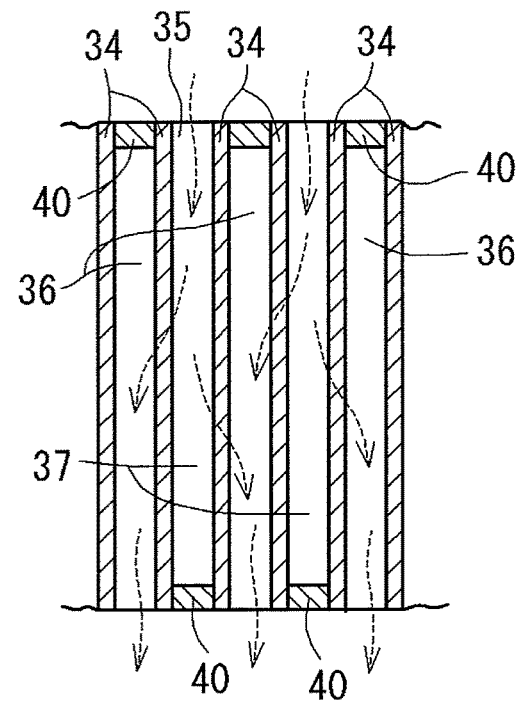
FIG. 11 is a vertical sectional development view of a deterioration suppressing portion of another embodiment.
Figure 12:
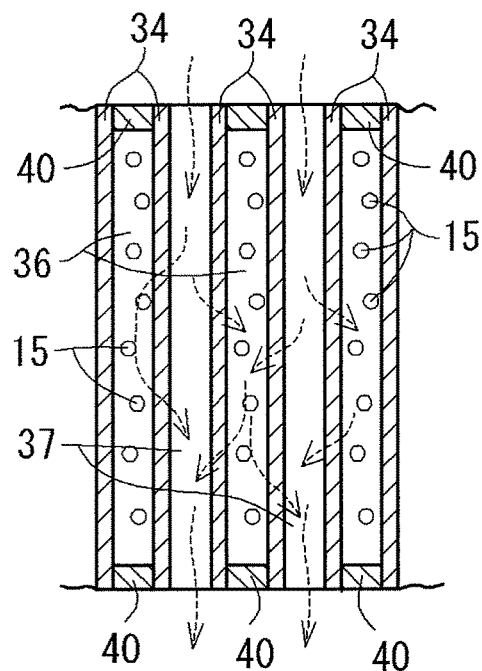
FIG. 12 is a vertical sectional development view of a deterioration suppressing portion of another embodiment.

When the flow passage wall 38 of the honeycomb structure is employed, as shown in FIG. 11 for example, one end of the first flow passage 36 in its longitudinal directions may be sealed by a sealing material 40, the other end of the second flow passage 37 in its longitudinal direction may be sealed by the sealing material 40. Further, as shown in FIG. 12 for example, both ends of the first flow passage 36 may be sealed by the sealing material 40, deterioration retarders may be charged into the first flow passage 36.

Figure 13A:
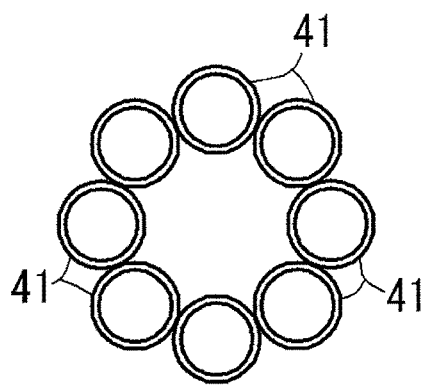
FIG. 13A is an explanatory diagram for explaining a deterioration suppressing portion of another embodiment.
Figure 13B:
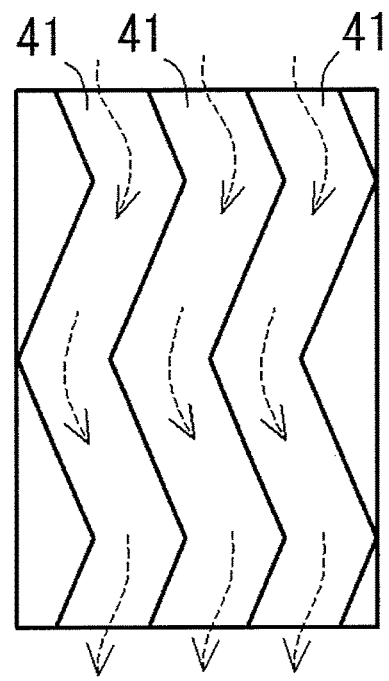
FIG. 13B is an explanatory diagrams for explaining a deterioration suppressing portion of another embodiment.
Figure 14A:
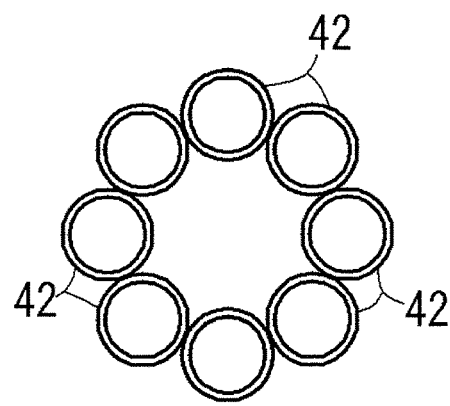
FIG. 14A is an explanatory diagrams for explaining a deterioration suppressing portion of another embodiment.
Figure 14B:
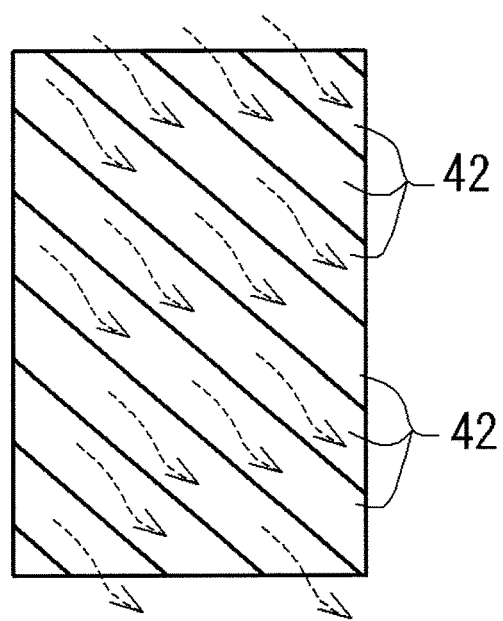
FIG. 14B is an explanatory diagrams for explaining a deterioration suppressing portion of another embodiment.
Figure 15:
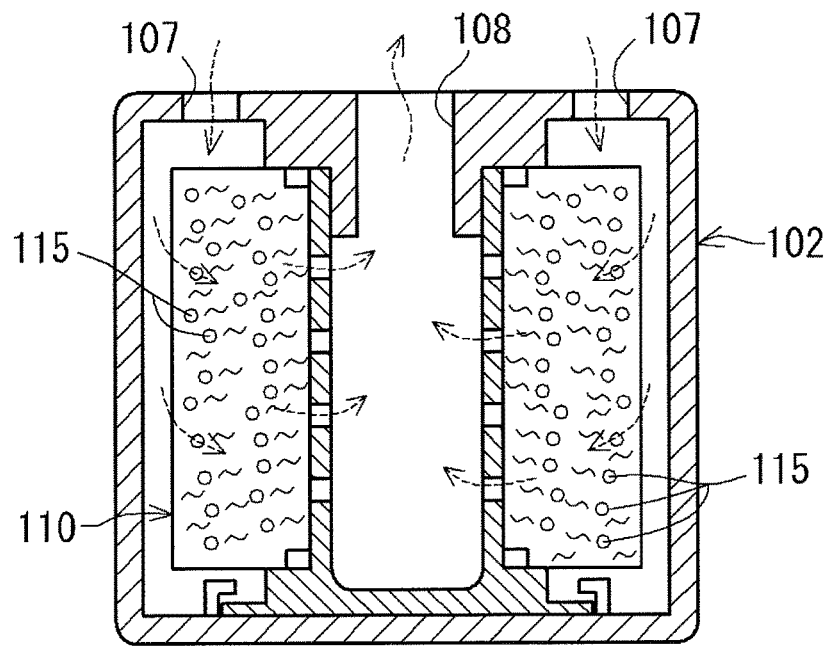
FIG. 15 is a vertical sectional view of a conventional oil filter.

Although oil flows between the flow passage walls 16 and 28 along the axial direction of the housing 2 in the examples 1 and 2, the invention is not limited thereto. It is possible to employ a flow passage wall 41 having a labyrinth structure in which oil flows in a meandering manner with respect to the axial direction of the housing 2 as shown in FIGS. 13A and B, and it is also possible to employ a flow passage wall 42 in which oil flows spirally around the shaft of the housing 2 as shown in FIGS. 14 A and B.

Although the filter element 10 is made of nonwoven fabric in the examples 1 and 2, the invention is not limited thereto. As a material of the filter element, it is possible to employ fiber body such as nonwoven fabric, paper, fabric and knit fabric; resin open cell foamed body such as urethane; and resin porous film.

Although the gap is formed between the inner wall of the housing 2 and the outer peripheral surface of the flow passage wall 16 in the example 1, the invention is not limited thereto, and the outer peripheral surface of the flow passage wall 16 may be brought into contact with the inner wall of the housing 2. Although the flow passage wall 28 is fixed to the outer periphery of the filter element 10 in the example 2, the invention is not limited thereto, and the flow passage wall 28 may be fixed to the inner wall of the housing 2. Although the single cylindrical flow passage wall 28 is exemplified in the example 2, the invention is not limited thereto, and a spiral or concentric flow passage wall may be employed.

Although the housing 2 can be disassembled and the filtering portion 3, 23 and the deterioration suppressing portion 4, 24 are directly replaced (so-called element replacing type) in the oil deterioration suppressing apparatus 1, 21 in the examples 1 and 2, the invention is not limited thereto, and it may be of a type in which an entire apparatus including the housing 2 is replaced (so-called spin-on type).

In the examples 1 and 2, the deterioration retarder 15, 27 is held in the flow passage wall 16, 28, and oil is made to infiltrate into the flow passage wall 16, 28 and to contact the deterioration retarder. However, the invention is not limited thereto. The deterioration retarder may be held so as to be exposed from a surface of the flow passage wall, and the oil may be brought into contact with the deterioration retarder on the surface side of the flow passage wall.

Although the oil deterioration suppressing apparatus 1, 21 used in a wet sump engine is exemplified in the examples 1 and 2, the invention is not limited thereto, and the oil deterioration suppressing apparatus may be used, for example, in a dry sump engine or in an automatic transmission.

2. Evaluation Test Example of Deterioration Retarder

<Test Example 1> [Evaluation of Deterioration Suppressing Effect (Deteriorated Material Trapping Effect) Using Various Kinds of Deterioration Retarders as a Filtering Material]

As one approach for removing deteriorated material in an oil deterioration suppressing technique, it was considered to suppress deterioration of oil by trapping initial deteriorated material before its polymerization and sludge formation. As the deterioration retarder (filtering material), a plurality of mesoporous inorganic materials including mesopores having a predetermined average pore diameter were used. To compare deteriorated material trapping effects, sepiolite in which a pore diameter distribution has no peak value, acidic white clay in which a pore diameter distribution has no peak value, diatom earth having an excessively large average pore diameter, zeolite having an excessively small average pore diameter, and non-porous silica were tested.

(1) Filtering Materials Used for the Test

Various kinds of filtering materials described in Tables 1 and 2 were used. Details of each of the filtering materials are as described in Tables 1 and 2. Five kinds of filtering materials [the following (e) to (i)] described in Table 2 are comparative test examples.

(a) Indefinite mesoporous silica (FSM) (produced by Taiyo Kagaku Corporation, trade name "TMPS-4")

(b) Activated white clay (produced by Musashiyuka Kabushiki Kaisha, trade name "Musashilite V")

(c) Silica gel (produced by Wako Pure Chemical Industries, Ltd., trade name "C-500HG")

(d) Activated alumina (produced by Union Showa K.K., trade name "VGL15")

(e) Sepiolite (produced by Ohmi Chemical Industry Co., Ltd., trade name "P-80V")

(f) Acidic white clay (produced by Nippon Kasseihakudo Kabushiki Kaisha, trade name "Nikkanite S-200")

(g) Diatom earth (produced by Showa Chemical Co., Ltd., trade name "Radiolite Special Flow")

(h) Zeolite (produced by Tosoh Corporation, trade name "zeolum A-3"])

(i) Non-porous silica (produced by Admatechs Company Limited, trade name "SO-E2")

TABLE 1

| | Filter element | | | |
|---|---|---|---|---|
| | F SM | Activated white clay | Silica gel | Activated alumina |
| Average pore diameter (nm) | 2.7 | 3.0 | 7.0 | 22.0 |
| Pore capasity ($cm^3/g$) | 0.78 | 0.41 | 0.74 | 0.68 |
| Specific surface ($m^2/g$) | 900 | 426 | 450 | 140 |

TABLE 2

| | Filter element | | | | |
|---|---|---|---|---|---|
| | Sepiolite | Acidic white clay | Diatom earth | Zeolite | Non-porous silica |
| Average pore diameter (nm) | No peak (1~20) | No peak (2~40) | 300 | 0.3 | — |
| Pore capacity ($cm^3/g$) | 0.25 | 0.13 | — | — | — |
| Specific surface ($m^2/g$) | 225 | 61 | — | — | — |

(2) Test

Using NOx deteriorated oil, a filtering test was conducted for mesoporous inorganic material used as filtering material and for a comparative test example filtering material. More specifically, oil component after filtering was analyzed by a Fourier transform infrared spectroscopic analysis (FT-IR), and a trapping effect of nitric ester which is initial deterioration component was verified.

(3) Test NOx Deteriorated Oil $NO_2$ gas was made to bubble in Toyota-genuine oil (trade name "Toyota Castle SM 5W-30") which is a commercially available engine oil in order to deteriorate the oil, NOx deteriorated oil imitating oil which was used in a gasoline engine for a long period was prepared and used in the test. Bubbling conditions are as described in Table 3.

TABLE 3

| Kind of oil | Toyota-genuine SM 5W-30 |
|---|---|
| Amount of oil | 300 mL |
| Density of $NO_2$ | 1000 ppm |
| Air flow rate | 205 mL/min |
| | (For humidification 165 mL/min) |
| $N_2$ gas flow rate | 50 mL/min |
| Flow rate of $N_2$ gas including 1 wt % $NO_2$ | 28 mL/min |
| Total gas flow rate | 283 mL/min |
| Oil temperature | 130° C. |
| Bubbling time | 40 h |

In Table 3, of a total gas flow rate of 283 mL/min, 28 mL/min which is a difference between an air flow rate of 205 mL/min and a nitrogen gas flow rate of 50 mL was supplied from a gas cylinder as nitrogen gas including 1 mass % $NO_2$.

(4) Filtering Method

Figure 16:
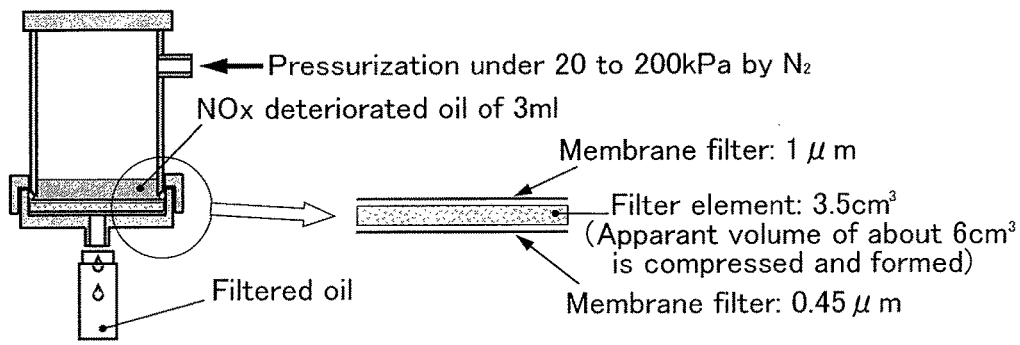
FIG. 16 is a schematic diagram of a filter apparatus which evaluates trapping of a deteriorated material according to a test example 1.

NOx deteriorated oil was filtered using an apparatus shown in FIG. 16. Particle filtering material having an apparent volume of about 6 $cm^3$ was dispersed on a membrane filter (produced by Sumitomo Electric Industries, Ltd, trade name "POREFLON FP045", pore size; 0.45 μm), and the filtering material was compressed and molded by a hydroforming machine under pressure of 4 MPa. Thereafter, a membrane filter (produced by Sumitomo Electric Industries, Ltd, trade name "POREFLON FP100", pore size; 1 μm) was placed on the formed filtering material, this laminated body was mounted on the filtering apparatus, and 3 mL NOx deteriorated oil was charged. Next, pressure was gradually increased to 20, 50, 100, 150 and 200 kPa by $N^2$ gas, and this laminated body was pressurized for two hours under each of these pressures.

(5) Evaluation Method of Deteriorated Material Trapping Effect (5-1) Analysis of Oil Component The test NOx deteriorated oil and the filtered oil were analyzed by FT-IR. An apparatus used and analysis conditions are as follows.

A Fourier transform infrared spectroscopic analysis apparatus; produced by Thermo Nicolet Japan, Inc., model type "Avatar 360"

Cell used; JASCO Corporation, liquid fixing cell, KBr, t=0.1 mm

Figure 17:
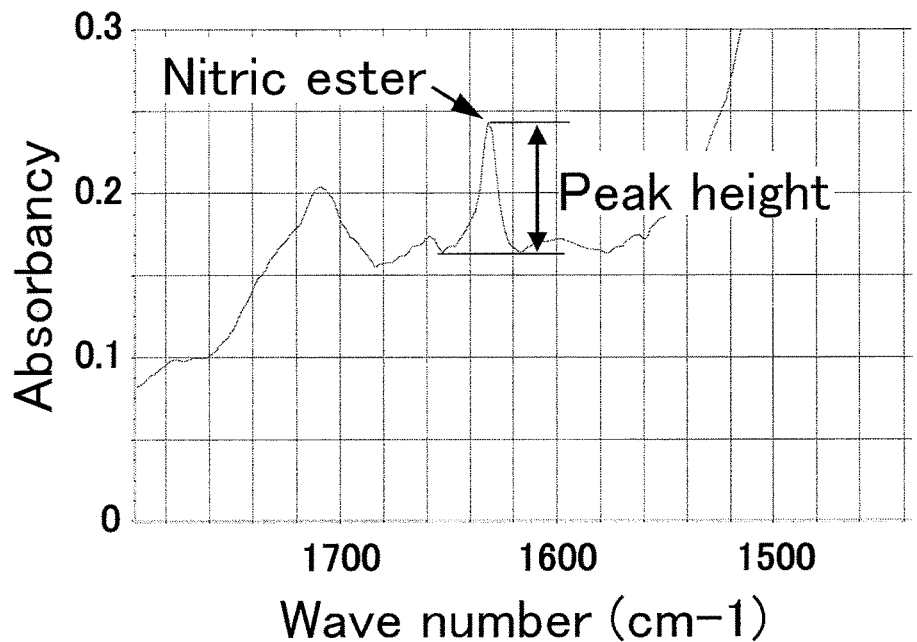
FIG. 17 is a chart of an infrared spectroscopic analysis of nitric ester which is initial deteriorated material.

Cumulated times; 32 times (5-2) Determination of Quantity of Trapped Deteriorated Material In the determination of quantity of trapped deteriorated material, nitric ester (wave number; 1630 $cm^{-1}$) which is one component of initial deterioration product material was focused on. In particular, peak heights corresponding to nitric ester in the IR spectrums of NOx deteriorated oil before and after filtering were measured and a reduction rate of the peak height is obtained. And a trapping ratio, as a indicator for the determination of quantity of trapped deteriorated material, was obtained from the reduction rate. FIG. 17 shows one example of IR spectrum of nitric ester of the test NOx deteriorated oil.

(6) Result of Evaluation of Deteriorated Material Trapping Effect

Figure 18:
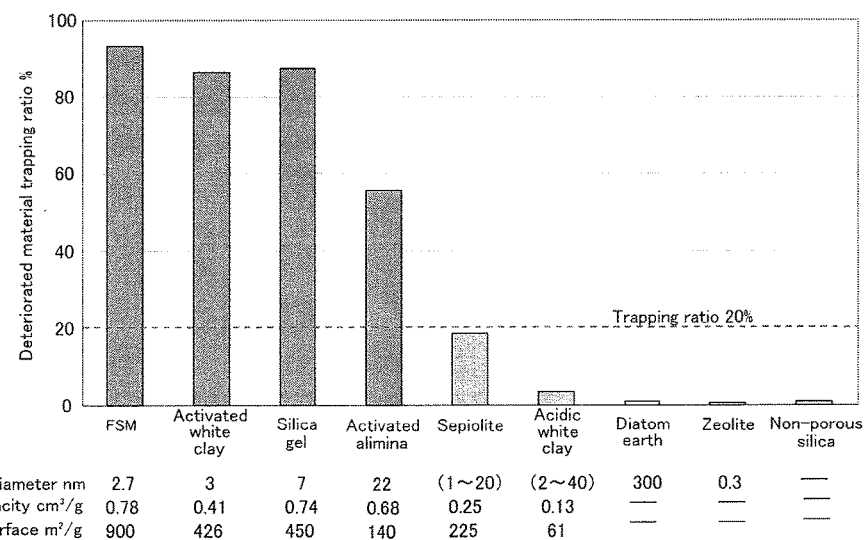
FIG. 18 is a graph showing a result of trapping of nitric ester.

FIG. 18 shows a result of evaluation. According to FIG. 18, a trapping ratio of initial deteriorated material is less than 20% and the trapping effect is inferior in the following materials as comparative test examples; sepiolite in which a pore diameter distribution has no peak value, acidic white clay in which a pore diameter distribution has no peak value, diatom earth having an excessively large average pore diameter as large as 300 nm, zeolite having an excessively small average pore diameter as small as 0.3 nm, and non-porous silica. On the other hand, in the case of FSM, activated white clay, silica gel and activated alumina, which are mesoporous inorganic materials, the trapping ratio exceeds 50%, and it is found that they have an excellent trapping effect. Especially in the case of FSM, activated white clay and silica gel, having an average pore diameter of as small as 2.7 to 7 nm and a specific surface of 426 to 900 $m^2/g$, the trapping effect exceeds 80%, and it is found that they have a more excellent trapping effect.

<Test Example 2> Deterioration Suppressing Evaluation Obtained by Oil Deterioration Test Apparatus)

Using activated white clay having the trapping ratio exceeding 80% and having an excellent trapping effect in the filtering test of the test example 1, a deterioration suppressing effect was evaluated in a real time test which was closer to oil deterioration conditions in an actual engine.

(1) Test Method

Figure 19:
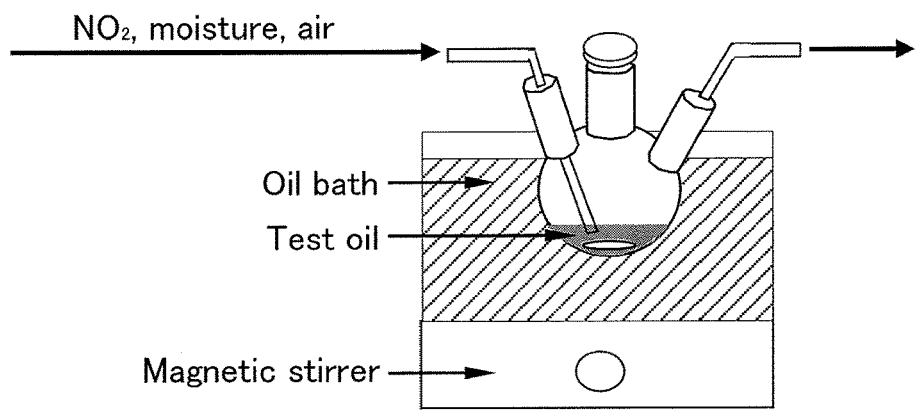
FIG. 19 is a schematic diagram of an apparatus used for a deterioration test of a test example 2.

In the real time test, a NOx deterioration test apparatus shown in FIG. 19 was used. More specifically, a lower portion of a glass test container of a three-neck flask type was immersed in an oil bath where temperature was adjusted to a predetermined temperature, Toyota-genuine oil (commercially available engine oil, trade name "Toyota Castle SM 5W-30", acid value of new oil: 2.5 mgKOH/g), contained and dispersed 3 mass % activated white clay, was put into the container from the central neck as test oil. A test of deterioration caused by NO) was carried out for 24 hours under test conditions described in Table 4. Air including moisture and $NO_2$ were made to flow into the test oil from a left inflow opening in FIG. 19, and they were made to flow out from a right outflow opening and the test was carried out.

TABLE 4

| Test oil | 40 g |
|---|---|
| | [SM 5W-30 + Activated white clay (3 mass %)] |
| Density of $NO_2$ | 1000 ppm |
| Air flow rate | 205 mL/min |
| | (For humidification 165 mL/min) |
| $N_2$ gas flow rate | 50 mL/min |
| Flow rate of $N_2$ gas including 1 wt % $NO_2$ | 28 mL/min |
| Total gas flow rate | 283 mL/min |
| Oil temperature | 40° C. (4 h) → 90° C. (4 h) - 1 Cycle |
| Test time | 24 h (8 h × 3 Cycle) |

In Table 4, of a total gas flow rate of 283 mL/min, 28 mL/min which is a difference between an air flow rate of 205 mL/min and a nitrogen gas flow rate of 50 mL was supplied from a gas cylinder as nitrogen gas including 1 mass % $NO_2$.

(2) Result of Test

Figure 20:
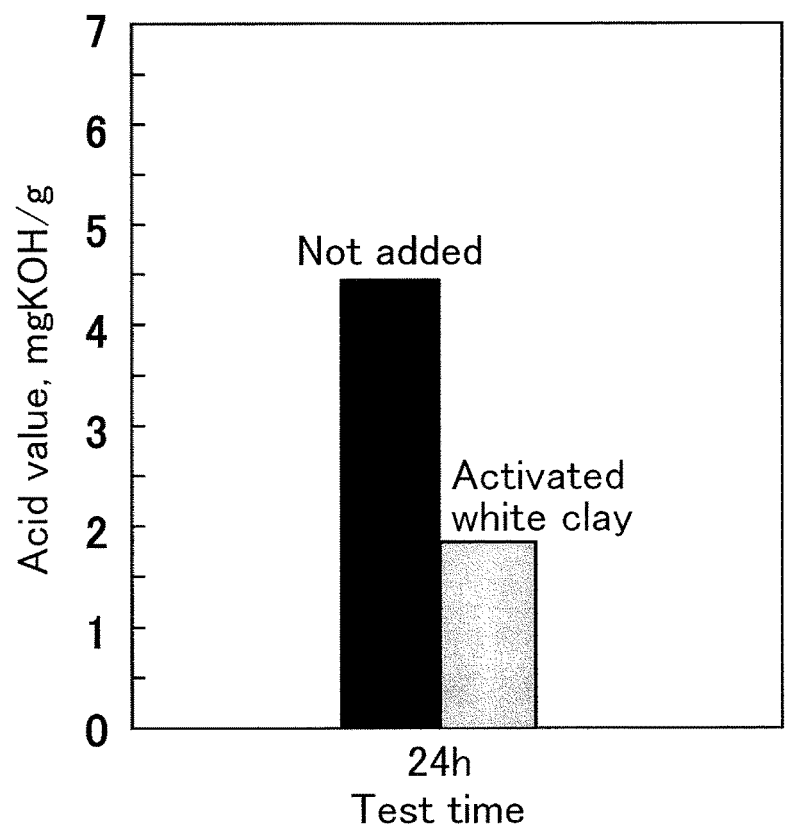
FIG. 20 is a graph showing, in comparison, an acid value when activated white clay is used and an acid value when activated white clay is not used.

A result of the test was evaluated based on variation in an acid value of oil after the test. FIG. 20 shows a result of the evaluation. According to FIG. 20, an acid value when activated white clay was contained was less than 50% of an acid value when the activated white clay was not contained. From this, it is found that if the activated white clay is contained, a rise of the acid value caused by the NOx deterioration test is sufficiently suppressed, and increase in acidic material in oil is suppressed.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

The present invention is widely utilized as a technique for suppressing deterioration of oil. Especially, the invention is suitably utilized as a technique for suppressing deterioration of engine oil of a vehicle such as a passenger car, a bus, a truck, a rail vehicle, a construction vehicle, an agricultural vehicle and an industrial vehicle.

What is claimed is:

1. An oil deterioration suppressing apparatus, comprising:
   a filtering portion including a filter element for filtering oil;
   a deterioration suppressing portion including a powdery deterioration retarder, which suppresses deterioration of the oil; and
   a housing having an interior space in which both the deterioration suppressing portion and the filtering portion are accommodated along an axial direction thereof, wherein
   an upper end edge of the filtering portion is spaced from a lower end edge of the deterioration suppressing portion in an axial direction of the oil deterioration suppressing apparatus,
   the deterioration suppressing portion includes flow passage walls which hold the powdery deterioration retarder and define oil flow passages such that the oil passes through gaps between adjacent flow passage walls of the flow passage walls,
   the flow passage walls are arranged in the deterioration suppressing portion in one of a spiral or concentric manner,
   the flow passage walls are porous layers made by nonwoven fabric and have a void ratio between 0.8 and 0.99 such that the powdery deterioration retarder is dispersed and maintained in the flow passage walls,
   the powdery deterioration retarder includes a mesoporous inorganic material,
   an average pore diameter of the mesoporous inorganic material is 1 to 30 nm, a pore capacity of the mesoporous inorganic material is 0.3 to 4.0 $cm^3/g$, and a specific surface of the mesoporous inorganic material is 120 to 2000 $m^2/g$,
   the mesoporous inorganic material is one of an indefinite mesoporous silica-based inorganic material, an activated white clay, a silica gel or an activated alumina, and
   when the oil flows through the oil deterioration suppressing apparatus, the oil sequentially flows along the axial direction of the oil deterioration suppressing apparatus through the deterioration suppressing portion to the filtering portion,
   wherein the housing includes a protector that includes a first support portion and a second support portion continuous in the axial direction with one end of the first support portion,
   wherein the first support portion supports the filtering portion, and the second support portion supports the deterioration suppressing portion, and
   wherein the protector is a unitary structure.

2. The oil deterioration suppressing apparatus according to claim 1,
   wherein the mesoporous inorganic material includes pores and 60% or more of an entire pore capacity has an average pore diameter falling within a range of ±40% of the average pore diameter.

3. The oil deterioration suppressing apparatus according to claim 1,
   wherein the flow passage walls include a corrugated portion which is formed into a corrugated shape.

4. The oil deterioration suppressing apparatus according to claim 1, wherein
   the housing is formed into a cylindrical shape,
   wherein a cross-sectional area of a space between an inner wall of the housing and an outer peripheral side of the deterioration suppressing portion is smaller than a cross-sectional area of a space between the inner wall of the housing and an outer peripheral side of the filtering portion, and
   wherein the housing is provided with an oil inflow opening which is formed so as to open near one axial end of the deterioration suppressing portion on a side of the housing separated from the filtering portion.

5. The oil deterioration suppressing apparatus according to claim 1, wherein
   the housing additionally includes a first case and a second case detachably fixed to each other.

6. The oil deterioration suppressing apparatus according to claim 5, wherein
   the protector is biased toward the first case by a biasing member provided between a first axial end of the protector and a bottom of the second case, and
   a second axial end of the protector is fitted to a convex portion projecting from a bottom of the first case.

7. The oil deterioration suppressing apparatus according to claim 5, wherein
   the flow passage walls are wound around an outer periphery of the second support portion, and
   a plurality of through holes are defined in the first support portion.

8. The oil deterioration suppressing apparatus according to claim 1, wherein a plurality of through holes are defined in the first support portion.

9. An oil deterioration suppressing apparatus, comprising:
   a filtering portion including a filter element for filtering oil;
   a deterioration suppressing portion including a powdery deterioration retarder, which suppresses deterioration of the oil; and
   a housing having an interior space in which both the deterioration suppressing portion and the filtering portion are accommodated along an axial direction thereof, wherein
   the deterioration suppressing portion includes flow passage walls which hold the powdery deterioration retarder and define oil flow passages such that the oil passes through gaps between adjacent flow passage walls of the flow passage walls,
   the flow passage walls are arranged in the deterioration suppressing portion in one of a spiral or concentric manner,
   the flow passage walls are disposed above the filtering portion so as to cover an outer periphery of the filtering portion,
   the flow passage walls are porous layers made by nonwoven fabric and have a void ratio between 0.8 and 0.99 such that the powdery deterioration retarder is dispersed and maintained in the flow passage walls,
   the powdery deterioration retarder includes a mesoporous inorganic material,
   an average pore diameter of the mesoporous inorganic material is 1 to 30 nm, a pore capacity of the mesoporous inorganic material is 0.3 to 4.0 $cm^3/g$, and a specific surface of the mesoporous inorganic material is 120 to 2000 $m^2/g$,
   the mesoporous inorganic material is one of an indefinite mesoporous silica-based inorganic material, an activated white clay, a silica gel or an activated alumina, and
   when the oil flows through the oil deterioration suppressing apparatus, the oil sequentially flows along the axial direction of the oil deterioration suppressing apparatus through the deterioration suppressing portion to the filtering portion, wherein the housing includes a protector that includes a first support portion and a second support portion continuous in the axial direction with one end of the first support portion, wherein the first support portion supports the filtering portion, and the second support portion supports the deterioration suppressing portion, and wherein the protector is a unitary structure.

10. The oil deterioration suppressing apparatus according to claim 9, wherein the mesoporous inorganic material includes pores and 60% or more of an entire pore capacity has an average pore diameter falling within a range of ±40% of the average pore diameter.

11. The oil deterioration suppressing apparatus according to claim 9, wherein the flow passage walls include a corrugated portion which is formed into a corrugated shape.

12. The oil deterioration suppressing apparatus according to claim 9, wherein the housing is formed into a cylindrical shape, wherein a cross-sectional area of a space between an inner wall of the housing and an outer peripheral side of the deterioration suppressing portion is smaller than a cross-sectional area of a space between the inner wall of the housing and an outer peripheral side of the filtering portion, and wherein the housing is provided with an oil inflow opening which is formed so as to be opposed to an axial end surface of at least one of the filtering portion and the deterioration suppressing portion.

13. The oil deterioration suppressing apparatus according to claim 9, wherein the housing additionally includes a first case and a second case detachably fixed to each other.

14. The oil deterioration suppressing apparatus according to claim 13, wherein the protector is biased toward the first case by a biasing member provided between a first axial end of the protector and a bottom of the second case, and a second axial end of the protector is fitted to a convex portion projecting from a bottom of the first case.

15. The oil deterioration suppressing apparatus according to claim 13, wherein the flow passage walls are wound around an outer periphery of the second support portion, and a plurality of through holes are defined in the first support portion.

16. The oil deterioration suppressing apparatus according to claim 9, wherein a plurality of through holes are defined in the first support portion.

17. An oil deterioration suppressing apparatus, comprising:

a filtering portion including a filter element for filtering oil;

a deterioration suppressing portion including a powdery deterioration retarder, which suppresses deterioration of the oil; and a housing having an interior space in which both the deterioration suppressing portion and the filtering portion are accommodated along an axial direction thereof, wherein an upper end edge of the filtering portion is spaced from a lower end edge of the deterioration suppressing portion in an axial direction of the oil deterioration suppressing apparatus, the deterioration suppressing portion includes flow passage walls which hold the powdery deterioration retarder and define oil flow passages such that the oil passes through gaps between adjacent flow passage walls of the flow passage walls, the flow passage walls are arranged in the deterioration suppressing portion in one of a spiral or concentric manner, the flow passage walls are porous layers made by non-woven fabric and have a void ratio between 0.8 and 0.99 such that the powdery deterioration retarder is dispersed and maintained in the flow passage walls, the powdery deterioration retarder includes a mesoporous inorganic material, an average pore diameter of the mesoporous inorganic material is 1 to 30 nm, a pore capacity of the mesoporous inorganic material is 0.3 to 4.0 cm$^3$/g, and a specific surface of the mesoporous inorganic material is 120 to 2000 m$^2$/g, the mesoporous inorganic material is one of an indefinite mesoporous silica-based inorganic material, an activated white clay, a silica gel or an activated alumina, and when the oil flows through the oil deterioration suppressing apparatus, the oil sequentially flows along the axial direction of the oil deterioration suppressing apparatus through the deterioration suppressing portion to the filtering portion, wherein the housing includes a protector that includes a first support portion and a second support portion continuous in the axial direction with one end of the first support portion, wherein the first support portion supports the filtering portion, and the second support portion supports a second filtering portion, and wherein the protector is a unitary structure.

18. The oil deterioration suppressing apparatus according to claim 17, wherein the housing additionally includes a first case and a second case detachably fixed to each other.

19. The oil deterioration suppressing apparatus according to claim 18, wherein the protector is biased toward the first case by a biasing member provided between a first axial end of the protector and a bottom of the second case, and a second axial end of the protector is fitted to a convex portion projecting from a bottom of the first case.

20. The oil deterioration suppressing apparatus according to claim 18, wherein the flow passage walls are disposed so as to cover an outer periphery of the filtering portion.

21. The oil deterioration suppressing apparatus according to claim 17, wherein a plurality of through holes are defined in the first support portion and the second support portion.

22. An oil deterioration suppressing apparatus, comprising:

a filtering portion including a filter element for filtering oil;

a deterioration suppressing portion including a powdery deterioration retarder, which suppresses deterioration of the oil; and a housing having an interior space in which both the deterioration suppressing portion and the filtering portion are accommodated along an axial direction thereof, wherein the deterioration suppressing portion includes flow passage walls which hold the powdery deterioration retarder and define oil flow passages such that the oil passes through gaps between adjacent flow passage walls of the flow passage walls, the flow passage walls are arranged in the deterioration suppressing portion in one of a spiral or concentric manner, the flow passage walls are disposed above the filtering portion so as to cover an outer periphery of the filtering portion, the flow passage walls are porous layers made by non-woven fabric and have a void ratio between 0.8 and 0.99 such that the powdery deterioration retarder is dispersed and maintained in the flow passage walls, the powdery deterioration retarder includes a mesoporous inorganic material, an average pore diameter of the mesoporous inorganic material is 1 to 30 nm, a pore capacity of the mesoporous inorganic material is 0.3 to 4.0 $cm^3/g$, and a specific surface of the mesoporous inorganic material is 120 to 2000 $m^2/g$, the mesoporous inorganic material is one of an indefinite mesoporous silica-based inorganic material, an activated white clay, a silica gel or an activated alumina, and when the oil flows through the oil deterioration suppressing apparatus, the oil sequentially flows along the axial direction of the oil deterioration suppressing apparatus through the deterioration suppressing portion to the filtering portion, wherein the housing includes a protector that includes a first support portion and a second support portion continuous in the axial direction with one end of the first support portion, wherein the first support portion supports the filtering portion, and the second support portion supports a second filtering portion, and wherein the protector is a unitary structure.

23. The oil deterioration suppressing apparatus according to claim 22, wherein
the housing additionally includes a first case and a second case detachably fixed to each other.

24. The oil deterioration suppressing apparatus according to claim 23, wherein
the protector is biased toward the first case by a biasing member provided between a first axial end of the protector and a bottom of the second case, and
a second axial end of the protector is fitted to a convex portion projecting from a bottom of the first case.

25. The oil deterioration suppressing apparatus according to claim 22, wherein a plurality of through holes are defined in the first support portion and the second support portion.

* * * * *